(No Model.)
A. McGRAY.
APPARATUS FOR SHIPPING LOBSTERS.
No. 485,422. Patented Nov. 1, 1892.
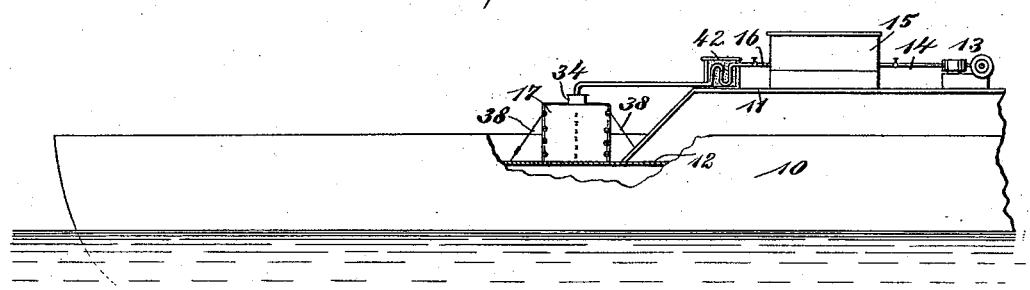
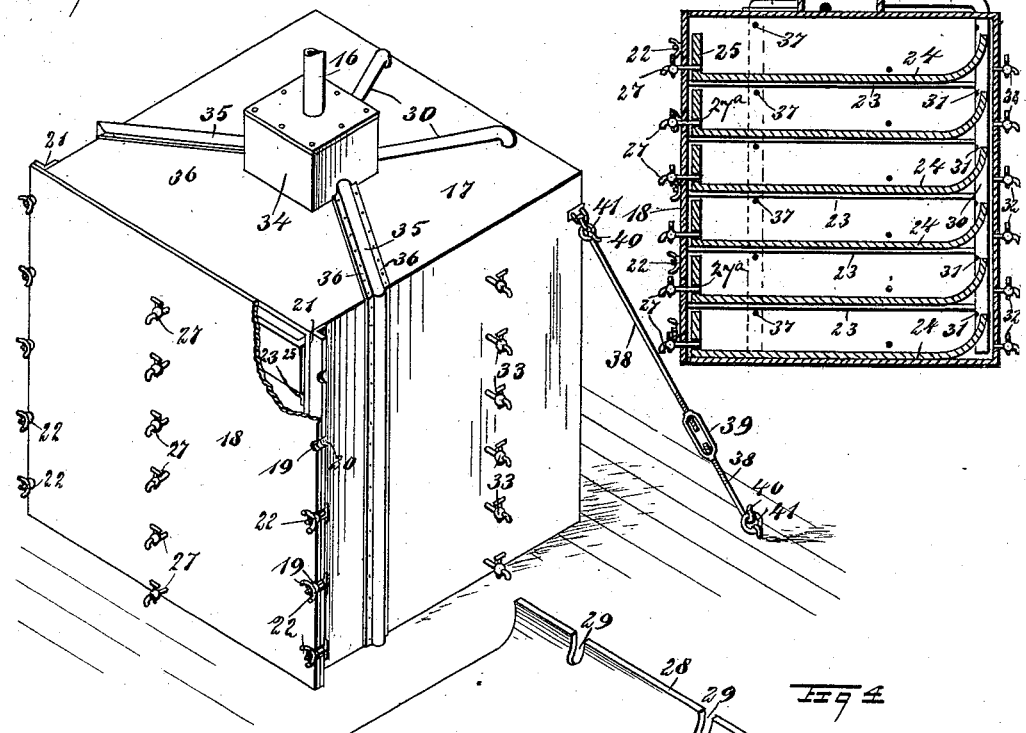
WITNESSES:
H. Walker
C. Sedgwick
INVENTOR
A. McGray
BY
Munn & Co
ATTORNEYS.

UNITED STATES PATENT OFFICE.

ARTHUR McGRAY, OF YARMOUTH, CANADA.

APPARATUS FOR SHIPPING LOBSTERS.

SPECIFICATION forming part of Letters Patent No. 485,422, dated November 1, 1892.

Application filed February 18, 1892. Serial No. 421,965. (No model.)

*To all whom it may concern:*

Be it known that I, ARTHUR McGRAY, of Yarmouth, in the Province of Nova Scotia and Dominion of Canada, have invented a new and Improved Apparatus for Shipping Live Lobsters, of which the following is a full, clear, and exact description.

My invention relates to improvements in an apparatus for shipping live lobsters or analogous fish; and the object of my invention is to produce a simple and convenient apparatus which may be carried on any vessel and by means of which lobsters may be transported long distances alive.

To this end my invention consists in certain features of construction and combinations of parts, which will be hereinafter described and claimed.

Reference is to be had to the accompanying drawings, forming a part of this specification, in which similar figures of reference indicate corresponding parts in all the views.

Figure 1 is a broken side elevation of the apparatus as applied to a vessel. Fig. 2 is a broken enlarged perspective view of the tank which holds the fish. Fig. 3 is a vertical section of the same, and Fig. 4 is a detail perspective view of one of the tank-shelves.

In the drawings, 10 represents a vessel, which may be of any approved construction, and it is shown provided with the usual bridge or promenade-deck 11, which is shown supported above the main deck 12, upon which a reservoir which supplies the fish with water may be placed; but the reservoir may be arranged in any convenient part of the vessel where it will have elevation enough to give sufficient head to the water.

A pump 13, which may be of any approved kind, is shown connected by means of a pipe 14 with a reservoir 15. The pump is adapted to pump sea-water into the reservoir. Opening from the reservoir 15 is a pipe 16, preferably having a valve, which pipe supplies water to the tank 17. The tank 17 is adapted to contain the lobsters or similar fish. The vessel may be provided with any desired number of these tanks and the tanks may be located in any part of the vessel; but they are preferably removably arranged on the main deck. Although I have shown a reservoir 15 to supply water to the tank 17 by gravity, it is evident that the tank 17 may be supported by the pump direct (thereby dispensing with the reservoir 15) or by other suitable means. The tank 17 is provided with a removable door 18, which door is to be firmly yet removably connected with the tank, and for this purpose the side edges of the door are provided with notches or apertures 19, which register with similar notches or apertures 20 in rails or angle-irons 21, which are secured to the tank on opposite sides of the door-opening. The notches or apertures 19 and 20 are adapted to receive clamping-bolts 22, which are provided with suitable nuts and by means of which the door is firmly fastened to the rails or angle-irons 21, although the door 18 may be otherwise detachably held upon the tank. Suitable gaskets are inserted between the tank or the rails or angle-irons 21 and the door 18, so that the door may be fastened water-tight to the tank.

Within the tank 17 and on opposite sides of the same and at right angles to the door are substantially-horizontal supports 23, (shown in Figs. 2 and 3,) which support a plurality of shelves 24, adapted to be arranged one above another. The tank may be made to hold any desired number of these shelves. The shelves fit snugly in the tank, and each shelf is preferably provided with a vertical front side 25, which is or may be substantially parallel with the door 18, the upper edge of the front side of the shelf being preferably cut away near the opposite ends, as shown at 26 in Fig. 4, thus forming hand-holds which enable the shelves to be easily drawn out of the tank; but other hand-holds can be used, as desired. Each shelf is also provided on its front side and near the bottom with an aperture $27^a$. (See Fig. 3.) Valves or cocks 27 are carried by the door 18, and when the parts are in place project into the apertures $27^a$ in the side 25 of the shelf. These valves provide means for letting the stagnant and impure water out of the shelves, whereby a continuous flow of pure water can be provided for the fish on each shelf. The shelves 24 are to be preferably individually supplied with water, and for this purpose in the example shown the rear ends of the shelves are curved upward, as shown at 28, and these curved ends when used are preferably slotted vertically, as shown at 29, the slots being adapted to receive the vertical feed-pipes 30, which extend down the back of the tank and within it, as shown in Fig. 3, the pipes extending through the tank-top and connecting with the water-chest 34 on the top of the tank, as described below. By this means the space occupied by the pipes 30 does not diminish the capacity of the shelves. The pipes 30 are provided with jet-openings or the like 31 above each shelf 24, as shown in Fig. 3, so that the water may flow freely upon the shelves individually, and on the back of the tank above each shelf is or may be a valve or cock 32, through which water may be withdrawn. A row of cocks or valves 33 is arranged on each side of the tank, as shown in Fig. 2, the cocks on the four sides being preferably used because the lobsters are liable to clog or dam up the flow of water, and by having the cocks arranged as described the water may be let out on all four sides of the tank from each shelf, thus insuring the complete circulation of water and prolonged life to the fish.

A water-chest 34 is or may be arranged upon the top of the tank 17, as shown in Figs. 2 and 3, and this chest connects with the pipes 30, as already described, and it also connects with the semicylindrical pipes 35, which have flanges 36, by means of which the pipes or spouts are fastened securely to the tank. These pipes or spouts 35 extend downward on opposite sides of the tank, their flat sides being placed next the walls of the tank, which walls are provided with openings 37, as shown in Fig. 3, each opening being placed adjacent to a shelf 24, so that the shelves may be conveniently and individually flooded at their sides. This arrangement of semicylindrical pipes on the outside of the tank leaves the inner side walls free, so that the sides of the shelves can run close to the walls. It is evident that the pipes 30 and semicylindrical pipes 35 could be interchanged, if desired. The tank is to be firmly secured to the deck, and for this purpose it is or may be provided with stay-rods 38 at all corners, there being two rods on a side, and these are preferably provided with a turnbuckle 39, by means of which they may be adjusted lengthwise. The stay-rods are suitably connected to the tank and deck, and for this purpose the ends of the rods are formed into hooks 40, which are adapted to engage rings 41, secured to the tank and to the adjacent deck.

In cold weather the sea-water will be sufficiently cold for the fish, &c.; but in warm weather the main feed-pipe 16 is or may be run through a cooling-chest or ice-box 42, as shown in Fig. 1, the pipe preferably being coiled within the box, so that the passing water will be cooled sufficiently to keep the fish in good order.

From the foregoing description it will be understood that these tanks may be located at convenient points upon any suitable vessel and that the fish, which are placed upon the shelves 24, may be kept well supplied with water.

To use the apparatus, the fish are placed upon the shelves 24 and the shelves inserted in the tank 17. The door 18 is closed and fastened tightly to the tank, and the water is then admitted into the chest 34 and evenly distributed through the pipes 30 and 35, the water thus entering on three sides of the tank, and as the water also exhausts from four sides of the tank the fish are thoroughly supplied with pure water. If the reservoir 15 is used, it is kept full of water to properly supply the water-chest 34 or the latter is supplied direct.

One principal advantage of my invention is that the tank 17 can be packed quite full of lobsters in separate layers or on shelves, and the remaining space is filled with water, which is evenly maintained, so that as the ship rocks the lobsters will not be tossed about, and thus their lives are preserved.

My device is portable and can be readily removed from or placed in position upon a vessel, and thus deck-room can be utilized, although the tanks can also be built in the vessel at the time of construction.

By the foregoing arrangement the door 18 can be removed and the lobsters given air and attention without disturbing the pipes or cocks in any manner.

By directing water upon each shelf the fish thereon are supplied directly with fresh water and the water can be drawn from each shelf, which materially assists in preserving the fish.

Having thus fully described my invention, I claim as new and desire to secure by Letters Patent—

1. An apparatus of the character described, comprising a tank having a detachable door, a series of shelves in the tank, a plurality of feed-pipes connecting with several sides of the tank and discharging onto the several shelves, exhaust valves or cocks opening from the tank, and a pumping apparatus to supply water to the feed-pipes, substantially as described.

2. An apparatus of the character described, comprising a tank having a plurality of shelves therein and exhaust valves or cocks opening therefrom, a reservoir held on a higher plane than the tank, a pipe connection between the reservoir and the tank and discharging onto the several shelves thereof, and a pump for raising water to the reservoir, substantially as described.

3. The combination, with a tank having a detachable door and having exhaust-cocks and supply-pipes, of shelves removably mounted in the tank, said shelves having upwardly-extending front and rear portions, substantially as described.

4. In an apparatus of the character described, the combination, with a tank provided with a door and with shelf-supports on the inside, of shelves having upwardly-projecting front and rear portions, the rear portion being notched, and vertical supply-pipes entering the notches of the shelves and discharging onto each of the said shelves, substantially as described.

5. In a shell-fish-preserving apparatus, a tank, shelves therein, supply-pipes discharging directly upon each shelf, and valves to draw water from each shelf, whereby the fish on each shelf are kept supplied with fresh water, substantially as described.

6. An apparatus of the character described, comprising a tank, a water-chest on its top, a series of shelves held in said tank, two pipes leading from the chest down the inside of one side of the tank and discharging onto the shelves, two pipes leading from the chest down on the inside of the tank and discharging through openings in the side of the tank onto the shelves, and a row of cocks on each side of the tank, substantially as described.

ARTHUR McGRAY.

Witnesses:
EDGAR TATE,
F. W. HANAFORD.